Patented Jan. 19, 1943

2,308,495

UNITED STATES PATENT OFFICE 2,308,495

INTERPOLYMERIZATION PRODUCT OF AN UNSATURATED ALKYD RESIN AND A MONOALLYL ESTER OF A NONVINYLIC MONOESTERIFIABLE ACID

Gaetano F. D'Alelio, Pittsfield, Mass., assignor to General Electric Company, a corporation of New York No Drawing. Application October 31, 1939, Serial No. 302,173

16 Claims. (Cl. 260—42)

This invention relates to the production of new materials having valuable and characteristic properties that make them especially suitable for use in industry, for example in molding, laminating, casting, coating and adhesive applications, and for other purposes. The invention is concerned more particularly with compositions of matter comprising an interpolymer (copolymer) or interpolymers of at least one polymerizable modified or unmodified polyhydric alcohol ester of an alpha unsaturated alpha beta polycarboxylic acid (hereafter for brevity designated generally as an "unsaturated alkyd resin") and at least one monoallyl ester of a mono-esterifiable inorganic acid or a non-phenolic mono-esterifiable organic acid having no

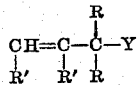

group or groups. Specfically the invention relates to (A) polymerizable compositions consisting of (1) a monoallyl ester of a non-vinylic mono-esterifiable acid (e. g., allyl chloride, allyl acetate, allyl furoate) in an amount corresponding to from 3 to 50 per cent, more particularly from 10 to 40 per cent, by weight of the mixture of the said resin and ester, and (3) a catalyst for accelerating the copolymerization of the copolymerizable materials of (1) and (2); and to (B) polymerized compositions obtained by polymerizing the polymerizable compositions of (A). Illustrative of the new products of the invention are synthetic resins consisting of an interpolymer of an unsaturated alkyd resin, e. g., diethylene glycol maleate, and from 10 to 40 per cent, by weight of the whole, of allyl chloride, acetate or furoate.

The monoesters of mono-esterifiable acids used in carrying the present invention into effect may be considered as being members of the class of esters which may be represented by the formula $$CH=C-\overset{R}{\underset{R'\ R'\ R}{C}}-Y$$

where R is a member of the class consisting of hydrogen and unsubstituted aliphatic and unsubstituted aromatic hydrocarbon radicals; R' is a member of the class which is the same as R and, in addition, a halogen; and Y is any non-phenol, non-vinylic mono-esterifiable acid, that is, any mono-esterifiable inorganic acid or any non-phenolic mono-esterifiable organic acid free from terminal

group or groups. Thus R may be, for example, any alkyl radical such at methyl, ethyl, propyl, isopropyl, butyl, secondary butyl, isobutyl, amyl, isoamyl, hexyl, octyl, etc., any carbocyclic radical such as phenyl, cresyl, xylyl, tolyl, naphthylphenylpropyl, cyclohexyl, ortho methyl cyclohexyl, etc. Examples of Y are the radicals of the saturated aliphatic monocarboxylic acids such as formic, acetic, propionic, butyric, valeric, caproic, heptylic, nonylic, capric, etc.; radicals of the cycloaliphatic monocarboxylic acid such as hexahydrobenzoic, hexahydrotoluic, hexahydrophenylacetic, hexahydrophenylpropionic, etc.; radicals of the aromatic monocarboxylic acids such as benzoic, toluic, phenylacetic, phenylpropionic, etc.; radicals of the non-vinylic monobasic acid, e. g., non-vinylic unsaturated monocarboxylic acids such as crotonic, isocrotonic, nonylenic, ethylidene propionic, gamma, deltahexenic, hydrosorbic, butylidene acetic, beta-chloracrylic, alpha-chlorcrotonic, angelic, tiglic, pyroterebic, etc., non-vinylic aromatic olefinic monocarboxylic acids such as cinnamic, alpha-chlorcinnamic, beta-chlorcinnamic, ortho-, meta- and para-nitrocinnamic, ortho-, meta- and para-methylcinnamic, phenyl - iso - crotonic, methyl atropic, 2 - methoxycinnamic, phenylpropiolic, piperic, etc., the non-vinylic aliphatic, cycloaliphatic and aromatic polycarboxylic acids in which all but one of the carboxylic radicals have been esterified by a saturated alcohol, e. g. monomethyl oxalate, monoethyl malonate, monopropyl succinate, monobutyl, adipate monoisobutyl sebacate, monoethyl maleate, monopropyl fumarate, monobtuyl tetrahydrophthalic, monoethyl hexahydrophthalic, monobutyl phthalic, etc.; the radicals of the inorganic monovalent acids as, for example, the halogen acids (hydrochloric, hydrofluoric, hydrobromic and hydroiodic), nitric, etc., the polyvalent inorganic acids in which all but one of the hydrogen atoms have been replaced by substituent groups, e. g., dialkyl acid phosphate (e. g. dimethyl acid phosphate, etc.), monoalkyl acid sulfate (e. g., monopropyl acid sulfate, etc.), dialkyl acid arsenate (e. g., dibutyl acid arsenate, etc.), trialkylorthosilicate (e. g. triethylorthosilicate, etc.), and the like. It will be noted in the above illustrative examples of Y that no radicals of phenolic acids are included therein. The monoallyl esters of phenolic acids are unsuited for carrying the present invention into effect, since phenolic bodies generally act as inhibitors of polymerization of ethylenic and acetylenic molecules. For purpose of brevity monoallyl esters of non-vinylic, non-phenolic mono-esterifiable acids are designated generally herein and in the appended claims as a "monoallyl ester of a non-vinylic mono-esterifiable acid."

More specific examples of monoallyl esters of non-vinylic mono-esterifiable acids that may be used in carrying the present invention into effect are allyl chloride, methallyl chloride, allyl furoate, 3-chloro-butene-1, allyl formate, allyl acetate, methallyl acetate, allyl benzoate, buten-(1)-yl-3-acetate, 2-chloroallyl acetate, crotyl acetate, 1-chloro-buten-(1)-yl-3-acetate, monomethyl mono-buten-(1)-yl-3-oxalate, dimethyl, monoallyl phosphate, etc.

The monoallyl esters of non-vinylic mono-esterifiable acids are, in themselves, relatively inactive bodies, showing little if any tendency to polymerize. When polymerization does occur, it is only to the extent that relatively low molecular weight bodies usually of a fluid nature are formed rather than high molecular weight resinous masses of commercial utility in the plastics and coating arts. This is shown by the following example: Allyl acetate containing 1% by weight of benzoyl peroxide was heated at 85 degrees C. for about 200 hours. No appreciable change in viscosity occurred in that time and the ester remained in liquid form.

On the other hand, the unsaturated alkyd resins alone are unsuited, even in the presence of polymerization catalysts such as peroxides, for the preparation of practically useful massive bodies. With or without polymerization catalysts, however, they may be applied in film form and, under the influence of heat or light, or heat and light, may be converted in a reasonable time to a cured film. But if effort be made to prepare commercially useful massive bodies from the unsaturated alkyds alone, heat treatment for 24 hours in the presence of a polymerization catalyst such as a super-peroxide usually gives unsuitable materials, that is, they generally lack the properties required for the usual service applications. For example, the cast or molded articles often are soft, rubbery masses (even after heat treatment for 24 hours at elevated temperatures) or, if hard bodies, frequently are filled with bubbles or show cracks, or both, when cured.

I have discovered that these and other difficulties in the production of useful, massive, cast or molded articles from unsaturated alkyd resins can be obviated by forming co-polymers of such resins with monoallyl esters of non-vinylic mono-esterifiable acids, as such esters hereinbefore have been defined. This was quite surprising and unexpected as these monoallyl esters alone, if polymerizable at all, yield viscous fluids rather than solids. It therefore may be considered that these monoallyl esters function as "bridging agents" for the unsaturated alkyd resins.

Another practical advantage resulting from my invention is that there are no difficulties in incorporating a catalyst into the mixed or dissolved components, as is usually the case when effort is made to polymerize an unsaturated alkyd resin alone, since the monoallyl esters of non-vinylic mono-esterifiable acids are good dispersion mediums for the usual polymerization catalysts. The copolymerization between the components proceeds satisfactorily, yielding interpolymerization products having properties quite different from the properties of the individual components when treated under the same conditions and different from mechanical admixtures of the separately treated components.

Compositions produced in accordance with this invention also are particularly well adapted for use as "solventless varnishes," for instance as coating compositions and binders in the production of laminated sheets and tapes for use in insulating electrical devices, as well as for other applications.

In carrying the present invention into effect a polymerizable esterification product of a polyhydric alcohol and an alpha unsaturated alpha beta polycarboxylic acid is first prepared in accordance with technique now well known to those skilled in the alkyd-resin art. Any polyhydric alcohol containing at least two esterifiable aliphatic hydroxyl groups, or mixtures of such alcohols, may be used in preparing the unsaturated alkyd resin. Examples of such polyhydric alcohols are ethylene glycol, di-, tri- and tetra-ethylene glycols, propylene glycol, trimethylene glycol, thiodiglycol, glycerine, penta-erythritol, etc. Any alpha unsaturated alpha beta polycarboxylic acid, or mixtures of such acids, may be reacted with the polyhydric alcohol or alcohols to form the unsaturated alkyd resin. Examples of such polycarboxylic acids are maleic, monohalomaleic, fumaric, monohalofumaric, citraconic, mesaconic, acetylene dicarboxylic, aconitic, itaconic and its homologues as, for instance, alpha methyl itaconic acid, alpha ethyl itaconic acid, alpha alpha dimethyl itaconic acid, etc. If available, anhydrides of these polycarboxylic acids may be employed.

In some cases, instead of using an unmodified unsaturated alkyd resin I may use a polymerizable unsaturated alkyd resin which has been internally modified by replacing a part, say up to about 75 mol per cent, of the unsaturated polycarboxylic acid with a non-ethylenic polycarboxylic acid, e. g., a saturated aliphatic polycarboxylic acid such as succinic, adipic, glutaric, pimelic, sebacic, azelaic, suberic, tricarballylic, tartaric, citric, etc., cyclic polycarboxylic acids, more specifically the saturated cycloaliphatic polycarboxylic acids such as the cyclopropane dicarboxylic acids, the cyclohexane dicarboxylic acids, the alkyl cycloalkane polycarboxylic acids, etc., and the aromatic polycarboxylic acids. e. g., phthalic, benzoyl phthalic, terephthalic, benzophenone-2,4' dicarboxylic acids, etc., or with anhydrides of such acids if available. Tartaric and citric acids are examples of hydroxy saturated polycarboxylic acids. The terms "polycarboxylic acid" and "dicarboxylic acid" as used generally herein and in the appended claims are intended to include within their meaning the anhydrides of the acids.

Various mono-esterifiable compounds also may be incorporated into the unmodified unsaturated alkyd resin or into such resin modified with a non-ethylenic polycarboxylic acid in order further to modify the same. Thus, in producing the copolymers of this invention I may use an unsaturated alkyd resin which has been modified by incorporating therein a saturated or unsaturated, normal or isomeric monohydric alcohol, or mixtures thereof, a saturated or unsaturated monocarboxylic acid, or mixtures thereof, or both such esterifiable monohydroxy organic compounds. Examples of monohydric alcohols that may be used as modifiers of the alkyd resin are propyl, isopropyl, butyl, isobutyl, amyl, isoamyl, hexyl, octyl, decyl, dodecyl to octadecyl, inclusive, allyl, methallyl, 1-chlorallyl, 2-chlorallyl, crotyl, cinnamyl, 3-hydroxy-butene-1, etc. The use of methyl and ethyl alcohols is not precluded, but in general these alcohols are less suitable because of their lower boiling points. As monobasic acids may be used, for example, the unsubstituted saturated or unsaturated, normal or isomeric acids containing only one esterifiable group such as acetic, propionic, butyric to stearic, inclusive, benzoic, acrylic, methacrylic, cinnamic, etc., acids of drying, semi-drying and drying oils, e. g., the acids of tung oil, linseed oil, rapeseed oil, soya bean oil, castor oil, etc. The monoesterifiable compound may be introduced into the esterification product before, during or after the esterification of the polyhydric alcohol with the polycarboxylic acid under conditions that inter-esterification of the mono-esterifiable compound with the incompletely esterified polyhydric alcohol-polycarboxylic acid reaction product is obtained. That is, the mono-esterifiable compound must be introduced into the reaction mass before all of the acid groups of the polybasic acid or all of the alcohol groups of the polyhydric alcohol have been esterified.

The term "unsaturated alkyd resin" as used generally herein and in the appended claims is intended to include within its meaning both unmodified esterification products of a polyhydric alcohol with an alpha unsaturated alpha beta polycarboxylic acid and polymerizable esterification products of the said components which have been modified, for example, as above briefly described. The modifying agent may be incorporated into the unsaturated alkyd resin in widely varying amounts, care being taken that the amount employed is not such as to render the said alkyd resin non-polymerizable or so slowly polymerizable as to limit the practical applications of the interpolymerization products prepared in accordance with this embodiment of the invention.

To achieve copolymerization of the unsaturated alkyd resin with the monoallyl ester of non-vinylic mono-esterifiable acid, a solution of the said resin in the said ester first preferably is effected. The monoallyl ester also advantageously may act as the carrier for a small amount of polymerization catalyst. Examples of polymerization catalysts that may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, various percompounds such as perborates, persulfates, perchlorates, etc., aluminum salts such as the halides, e. g., aluminum chloride, etc., metal compounds of the unsaturated acids as, for instance, cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the monoallyl ester and the unsaturated alkyd resin is of secondary importance, copolymerization between these components may be effected merely under the influence of heat, light, or heat and light and in the absence of an accelerator of polymerization. The rate of copolymerization and the properties of the final product vary with the time, temperature and, if a catalyst is used, also with the catalyst concentration. Copolymerization may be effected at from room temperature (20° to 30° C.) to temperatures above 100° C., for example about 130° C., but ordinarily I use temperatures within the range of 60° to 120° C. in causing the mixed components to interpolymerize.

In order that those skilled in the art better may understand how the present invention may be carried into effect, the following examples are given by way of illustration. All parts are by weight.

*Example 1*

| | Parts |
|---|---|
| Acetic-anhydride-modified diethylene glycol maleate* | 90 |
| Allyl acetate | 20 |
| Benzoyl peroxide | 1 |

*Note.—This modified unsaturated alkyd resin was prepared by mixing and refluxing for 1 hour in a nitrogen atmosphere 88 parts maleic anhydride, 106 parts diethylene glycol and 10 parts acetic anhydride, followed by further reaction simultaneously with distillation for 4 to 5 hours at about 190° C. The resin was very pale yellow in color and quite fluid.

The allyl acetate into which the benzoyl peroxide first was incorporated was mixed with the resin, yielding a fairly thin, readily pourable solution. When heated for 10 minutes at 110° C. the solution of the components gelled to a firm mass, which on further heating was converted into a hard, flexible interpolymer.

Cellulose acetate ribbon was immersed in the polymerizable composition of this example for approximately 1 hour. The excess material was removed from the cellulose by means of a doctor blade. The thus coated and impregnated ribbon was wound as insulation on wire and subjected to a temperature of about 100° to 130° C. for approximately ½ to 3 hours, yielding an insulated conductor having as insulation a solid, continuous, heat-resistant, strongly adhering surface coating, said insulation comprising cellulose ester, specifically cellulose acetate, coated and impregnated with an interpolymerization product of allyl acetate and acetic-anhydride-modified diethylene glycol maleate.

Fillers such as alpha cellulose, wood flour, etc., may be impregnated with the polymerizable composition to form a molding composition capable of being molded under heat and pressure to form molded articles of good appearance and physical characteristics.

*Example 2*

| | Parts |
|---|---|
| Acetic-anhydride-modified ethylene glycol itaconate* | 90 |
| Allyl acetate | 20 |
| Benzoyl peroxide | 1 |

*Note.—This modified unsaturated alkyd resin was prepared by mixing and refluxing for about 3 hours in a nitrogen atmosphere 65 parts itaconic acid, 33 parts ethylene glycol and 6 parts acetic anhydride, followed by further reaction simultaneously with distillation for about 2 hours at about 190° C. This resin was somewhat more viscous than the resin of Example 1.

The mixed components were treated as described under Example 1, yielding a hard interpolymer after heating for 9 minutes at 110° C., which became even harder after heating for one hour at this temperature.

Example 3

| | Parts |
|---|---|
| Diethylene glycol maleate* | 90 |
| Allyl acetate | 20 |
| Benzoyl peroxide | 1 |

*Note.—This unsaturated alkyd resin was prepared by mixing and heating in a nitrogen atmosphere 98 parts maleic anhydride and 106 parts diethylene glycol over a period of 1 hour to a temperature of about 190° C. and holding the mass at that temperature for about 3 to 5 hours.

The allyl acetate containing the benzoyl peroxide was mixed with the resin and the mixed components placed in an 85°–90° C. oven. The mass was converted into an extremely hard, insoluble and infusible copolymer in about 10 minutes. After further heating for 15 hours the interpolymerization product was only slightly harder than at the end of one hour.

Example 4

| | Parts |
|---|---|
| Diethylene glycol maleate prepared as described under Example 3 | 90 |
| Allyl furoate | 20 |
| Benzoyl peroxide | 1 | were mixed, after solution of the peroxide in the furoate ester had been effected. The solution was heated at 85° to 90° C., yielding a hard copolymer in from 2 to 24 hours.

It will be understood, of course, that my invention is not limited to the particular components set forth in the above illustrative examples and that various other unsaturated alkyd resins and monoallyl esters of non-vinylic mono-esterifiable acids may be employed in producing the new interpolymerization products of this invention. Illustrative examples of other modified and unmodified unsaturated alkyd resins that may be used are:

Ethylene glycol (20 parts), maleic anhydride (29.4 parts) and succinic acid (3.3 parts)
Diethylene glycol (31.8 parts), maleic anhydride (27.9 parts) and tung oil acids (7.6 parts)
Ethylene glycol (12 parts), maleic anhydride (11.76 parts), linseed oil acids (10.1 parts) and phthalic anhydride (8.9 parts)
Diethylene glycol (30.6 parts), maleic anhydride (17.6 parts) and itaconic acid (15.6 parts)
Ethylene glycol (17.4 parts), maleic anhydride (28.8 parts) and stearic acid (3.4 parts)
Diethylene glycol (20.4 parts), maleic anhydride (16.6 parts) and soya bean acids (15.2 parts)
Glycerine (18.4 parts) and maleic anhydride (29.4 parts)
Diethylene glycol (30.3 parts), maleic anhydride (13.2 parts) and phthalic anhydride (21.7 parts)
Glycerine (25.76 parts), maleic anhydride (13.72 parts) and phthalic anhydride (20.72 parts)
Ethylene glycol (18 parts) and maleic anhydride (27.4 parts)
Diethylene glycol (160 parts) and maleic anhydride (147 parts)
Diethylene glycol (30.6 parts), maleic anhydride (27.93 parts) and decyl alcohol (4.7 parts)
Ethylene glycol (18 parts), maleic anhydride (29.4 parts), octyl alcohol (2.6 parts) and stearic acid (5.16 parts)
Ethylene glycol (17.7 parts), maleic anhydride (26.46 parts) and acetic anhydride (7.08 parts)
Diethylene glycol (35.4 parts), maleic anhydride (27.95 parts) and linseed oil acids (7.7 parts)
Ethylene glycol (18 parts), maleic anhydride (27.93 parts) and octyl alcohol (3.9 parts)
Ethylene glycol (35.4 parts), maleic anhydride (29.4 parts), octyl alcohol (13 parts) and acetic anhydride (11.8 parts)
Ethylene glycol (23 parts) and itaconic acid (52 parts)
Diethylene glycol (106 parts) and itaconic acid (130 parts)
Glycerine (18.4 parts) and itaconic acid (39 parts)
Diethylene glycol (19.6 parts), itaconic acid (26 parts) and stearic acid (2.25 parts)
Ethylene glycol (62.05 parts), itaconic acid (32.51 parts) and phthalic anhydride (111.03 parts)
Glycerine (20 parts), itaconic acid (29 parts) and phthalic anhydride (11 parts)
Diethylene glycol (20 parts), itaconic acid (18.2 parts) and succinic acid (7.08 parts)
Glycerine (12.2 parts), itaconic acid (19.5 parts) and linseed oil acids (14.2 parts)
Glycerine (65 parts), itaconic acid (16.5 parts), linseed oil fatty acids (140 parts) and phthalic anhydride (45 parts)
Glycerine (12.2 parts), itaconic acid (11.2 parts), phthalic anhydride (5.4 parts) and soya bean acids (13.9 parts)
Ethylene glycol (6 parts), itaconic acid (14.3 parts) and octadecyl alcohol (5.4 parts)
Ethylene glycol (10.6 parts), itaconic acid (14.4 parts) and decyl alcohol (3.7 parts)
Ethylene glycol (15 parts), itaconic acid (31 parts) and tung oil acids (65 parts)
Ethylene glycol (5.9 parts), itaconic acid (11.7 parts) and castor oil acids (25.8 parts)

Illustrative examples of other monoallyl esters of non-vinylic mono-esterifiable acids that may be employed are:

allyl chloride

allyl bromide

allyl iodide

methallyl chloride

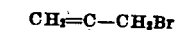
methallyl bromide

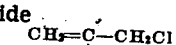
ethallyl chloride

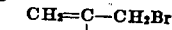
ethallyl bromide

3-chloro-butene-1

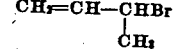
3-bromo-butene-1

3-dichloro-propene-1

3-dichloro-butene-1

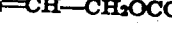
allyl formate

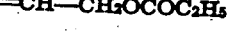
allyl acetate

allyl proprionate

allyl butyrate allyl valerate
$$CH_2=CH-CH_2OCOC_4H_9$$
allyl caproate
$$CH_2=CH-CH_2OCOC_5H_{11}$$
allyl heptoate
$$CH_2=CH-CH_2OCOC_6H_{13}$$
allyl caprylate
$$CH_2=CH-CH_2OCOC_7H_{15}$$
allyl pelargonate
$$CH_2=CH-CH_2OCOC_8H_{17}$$

methallyl acetate
$$CH_2=\underset{CH_3}{C}-CH_2OCOCH_3$$
methallyl proprionate
$$CH_2=\underset{CH_3}{C}-CH_2OCOC_2H_5$$
methallyl butyrate
$$CH_2=\underset{CH_3}{C}-CH_2OCOC_3H_7$$
methallyl valerate
$$CH_2=\underset{CH_3}{C}-CH_2OCOC_4H_9$$
methallyl caproate
$$CH_2=\underset{CH_3}{C}-CH_2OCOC_5H_{11}$$
methallyl heptoate
$$CH_2=\underset{CH_3}{C}-CH_2OCOC_6H_{13}$$
methallyl caprylate
$$CH_2=\underset{CH_3}{C}-CH_2OCOC_7H_{15}$$
methallyl pelargonate
$$CH_2=\underset{CH_3}{C}-CH_2OCOC_8H_{17}$$

buten-(1)-yl-3-acetate
$$CH_2=CH-\underset{CH_3}{CH}-OCOCH_3$$
buten-(1)-yl-3-propionate
$$CH_2=CH-\underset{CH_3}{CH}-OCOC_2H_5$$
buten-(1)-yl-3-butyrate
$$CH_2=CH-\underset{CH_3}{CH}-OCOC_3H_7$$
buten-(1)-yl-3-valerate
$$CH_2=CH-\underset{CH_3}{CH}-OCOC_4H_9$$
buten-(1)-yl-3-caproate
$$CH_2=CH-\underset{CH_3}{CH}-OCOC_5H_{11}$$

2-chlorallyl acetate
$$CH_2=\underset{Cl}{C}-CH_2-OCOCH_3$$
2-chlorallyl propionate
$$CH_2=\underset{Cl}{C}-CH_2-OCOC_2H_5$$

buten-(1)-yl-3-heptoate
$$CH_2=CH-\underset{CH_3}{CH}-OCOC_6H_{13}$$
buten-(1)-yl-3-caprylate
$$CH_2=CH-\underset{CH_3}{CH}-OCOC_7H_{15}$$
buten-(1)-yl-3-pelargonate
$$CH_2=CH-\underset{CH_3}{CH}-OCOC_8H_{17}$$

3-nitrobutene-1
$$CH_2=CH-\underset{CH_3}{CH}-NO_2$$

monoethyl monobuten-(1)-yl-3-oxalate
$$CH_2=CH-\underset{CH_3}{CH}-OCOCOOC_2H_5$$
buten-(1)-yl-3-benzoate
$$CH_2=CH-\underset{CH_3}{CH}-OCOC_6H_5$$
buten-(1)-yl-3-beta-chloracrylate
$$CH_2=CH-\underset{CH_3}{CH}-OCOCH=CHCl$$
buten-(1)-yl-3-cinnamate
$$CH_2=CH-\underset{CH_3}{CH}-OCOCH=CHC_6H_5$$
buten-(1)-yl-3-chloracetate
$$CH_2=CH-\underset{CH_3}{CH}-OCOCH_2Cl$$

crotyl acetate
$$CH_3CH=CH-CH_2OCOCH_3$$
crotyl propionate
$$CH_3CH=CHC_2OCOC_2H_5$$
crotyl butyrate
$$CH_3CH=CHCH_2OCOC_3H_7$$
crotyl valerate
$$CH_3CH=CH-CH_2-OCOC_4H_9$$
crotyl caproate
$$CH_3CH=CH-CH_2-OCOC_5H_{11}$$
crotyl heptoate
$$CH_3CH=CH-CH_2OCOC_6H_{13}$$

1-chlor-buten-(1)-yl-3-acetate
$$ClCH=CH-\underset{CH_3}{CH}-OCOCH_3$$
1-chlor-buten-(1)-yl-3-propionate
$$ClCH=CH-\underset{CH_3}{CH}-OCOC_2H_5$$
1-chlor-buten-(1)-yl-3-butyrate
$$ClCH=CH-\underset{CH_3}{CH}-OCOC_3H_7$$
1-chlor-buten-(1)-yl-3-valerate
$$ClCH=CH-\underset{CH_3}{CH}-OCOC_4H_9$$
1-chlor-buten-(1)-yl-3-caproate
$$ClCH=CH-\underset{CH_3}{CH}-OCOC_5H_{11}$$
1-chlor-buten-(1)-yl-3-cinnamate
$$ClCH=CH-\underset{CH_3}{CH}-OCOCH=CHC_6H_5$$
1-chlor-buten-(1)-yl-3-beta-chloracrylate
$$ClCH=CH-\underset{CH_3}{CH}-OCOCH=CHCl$$
1-chlor-buten-(1)-yl-3-benzoate
$$ClCH=CH-\underset{CH_3}{CH}-OCOC_6H_5$$

diethyl monoallyl phosphate
$$CH_2=CH-CH_2-O-\overset{O}{\underset{\|}{P}}-(OC_2H_5)_2$$

In certain cases, instead of copolymerizing a single monoallyl ester of a non-vinylic mono-esterifiable acid with a single unsaturated alkyd resin, I may copolymerize a plurality of such esters with a single unsaturated alkyd resin or with a plurality of such resins. In this way it is possible to obtain a composition comprising a mixture of interpolymers best adapted to meet a particular service application. Also, in carrying the present invention into effect polymerization catalysts other than benzoyl peroxide may be employed, for instance accelerators of polymerization such as hereinbefore mentioned.

Although in the foregoing examples I have shown the production of interpolymers by copolymerizing a minor proportion (approximately 18 per cent by weight) of a monoallyl ester of a non-vinylic mono-esterifiable acid with a major proportion (approximately 82 per cent by weight) of an unsaturated alkyd resin, it will be understood of course that the invention is not limited to these particular proportions of components and that various other percentage ratios may be employed. The incorporation of a small amount, e. g., 3 or 4 per cent, of these monoallyl esters into an unsaturated alkyl resin has a beneficial effect upon such alkyd resins, yielding products of improved properties or of greater ease in handling during polymerization than is the case with unsaturated alkyd resins which have been polymerized in the absence of such monoallyl ester. However, somewhat better results usually are obtained when the monoallyl ester constitutes, say, 6 or 8 per cent by weight of the mixed starting components. In most cases the mixed components are so proportioned that the monoallyl ester constitutes from 10 to 40 per cent by weight of the whole, as optimum results for most service applications are obtained within these ranges of proportions. The use of higher amounts of monoallyl ester, however, is not precluded. Thus, in the production of organic plastic masses or coating compositions for applications where rapidity of interpolymerization is of secondary consideration, the monoallyl ester may constitute, say, 45 or 50 per cent, or more, by weight of the whole, depending, for example, upon the particular starting components and the particular properties desired in the copolymer.

The interpolymerization products of this invention have a wide range of properties. Depending, for instance, upon the particular unsaturated alkyd resin and the particular monoallyl ester of a non-vinylic mono-esterifiable acid employed, the particular proportions thereof, the conditions of polymerization (temperature, time, pressure, presence or absence of catalyst, kind of catalyst used, if any, as well as the catalyst concentration, etc.) they vary from soft, flexible, soluble bodies to hard, rigid masses of varying resistance to solvents. In intermediate stages of copolymerization some form fluid compositions of varying intrinsic viscosities and may be so used. For coating or impregnating applications where the presence of a small amount of solvent in the cured composition is not objectionable, the mixed polymerizable materials may be diluted with volatile or non-volatile solvents to viscosities best adapted for the particular service application, and then may be copolymerized after application of the solution to the particular article to be coated or impregnated. By suitable selection of the starting materials and the conditions of interpolymerization, interpolymers can be obtained in an insoluble, infusible state practically resistant to the destructive effect of other chemical bodies such as acids, bases, solvents and the like.

These new compositions may be used alone or with fillers, dyes, pigments, opacifiers, lubricants, plasticizers or other modifying agents in, for example, casting, molding and laminating applications, as adhesives, impregnants and surface-coating materials. More specific examples of fillers and other modifying agents that may be employed are lignin, partially hydrolyzed wood, wood flour, alpha flock, sand, clays, asbestos, mica, paper, cloth, cellulose derivatives such as cellulose itself, regenerated cellulose, cellulose esters, natural and synthetic filaments or fibers, etc., in continuous, shredded or comminuted form. Synthetic and natural resins, gums, oils, waxes, polyhalogenated aromatic derivatives, etc., likewise may be added as modifying agents. Plasticizers such as the alkyl phthalates, e. g., dibutyl phthalate, etc., higher alcohols, etc., may be used to condition the interpolymerization product. Pigments such as zinc sulfate, barium sulfate, titanium compounds such as the oxides, the phthalates, etc., may be incorporated into the compositions.

In coating, impregnating and similar applications the mixed components, without added solvent, may be applied to the object to be treated and polymerized as hereinbefore described, with or without the application of pressure, to form the copolymer in situ. These new compositions may be used as impregnants for many porous bodies, such as cork, pottery, felts, or fabricated bodies with interstices, such as netted fibers, interwoven fibrous materials, etc. They also may be used for protectively coating impervious articles such as metals, e. g., iron or copper wire, or for coating or coating and impregnating articles such as paper, wood, cloth, glass fibers in felted, woven or other form, concrete, linoleum, stone, slate, synthetic boards, etc. They also may be employed in the production of wire enamels and winding tapes.

The mixed components or partial interpolymers thereof, with or without modifying agents, may be cast and molded under heat or under heat and pressure. They also may be molded by injection, extrusion or compression molding technique whereby they are heat- and pressure-hardened to yield numerous molded articles of manufacture for industrial, household and novelty uses.

Valuable dielectric media may be produced by interpolymerizing an unsaturated alkyd resin and a monoallyl ester of a non-vinylic mono-esterifiable acid in the presence of other dielectric materials such as hydrocarbon oils, halogenated aromatic bodies, e. g., the mono- and poly-halogenated phenyls, diphenyls, naphthalenes, etc.

The new compositions of this invention are particularly adapted for the impregnation of electrical coils used as a part of any electrical system, such as are found in magnetic circuits, dynamo-electric machines, etc. In such applications the coil is impregnated with the monomeric or partially copolymerized materials and interpolymerization of the starting components is effected in situ. In this way durable, rigid coils wherein the coil is embedded in a solid mass of the interpolymerization product may be produced.

What I claim as new and desire to secure by Letters Patent of the United States is:

1. A polymerizable composition consisting of (1) an unsaturated alkyd resin, (2) a monoallyl ester of a non-vinylic mono-esterifiable acid in an amount corresponding to from 3 to 50 per cent by weight of the mixture of the said resin and ester, and (3) a catalyst for accelerating the copolymerization of the copolymerizable materials of (1) and (2).

2. The polymerized composition of claim 1.

3. A resinous product consisting of an interpolymer of an unsaturated alkyd resin and from 3 to 50 per cent, by weight of the whole, of a monoallyl ester of an inorganic monoacid.

4. A resinous composition consisting of an interpolymer of an unsaturated alkyd resin and from 10 to 40 per cent, by weight of the whole, of an allyl ester of a halogen acid.

5. As a new product, a synthetic resin consisting of an interpolymer of an unsaturated alkyd resin and from 10 to 40 per cent, by weight of the whole, of allyl chloride.

6. A resinous product of polymerization of a mixture of copolymerizable materials consisting of (1) an unsaturated alkyd resin and (2) a monoallyl ester of a non-vinylic monocarboxylic acid in an amount corresponding to from 3 to 50 per cent by weight of the mixture of the said resin and ester.

7. A synthetic, polymerized composition consisting of an interpolymer of an unsaturated alkyd resin and from 10 to 40 per cent, by weight of the whole, of a monoallyl ester of a saturated aliphatic monocarboxylic acid.

8. A resinous product consisting of an interpolymer of an unsaturated alkyd resin and from 10 to 40 per cent, by weight of the whole, of a monoallyl ester of a saturated aliphatic monocarboxylic acid containing less than 10 carbon atoms.

9. As a new product, a synthetic resin consisting of an interpolymer of an unsaturated alkyd resin and from 10 to 40 per cent, by weight of the whole, of allyl acetate.

10. A resinous composition consisting of an interpolymer of an unsaturated alkyd resin and from 10 to 40 per cent, by weight of the whole, of allyl furoate.

11. A resinous product of polymerization of a mixture of copolymerizable materials consisting of (1) a polymerizable esterification product of ingredients comprising a dihydric alcohol and an alpha unsaturated alpha beta dicarboxylic acid and (2) a monoallyl ester of a non-vinylic mono-esterifiable acid in an amount corresponding to from 3 to 50 per cent by weight of the mixed components of (1) and (2).

12. A resinous composition obtained by polymerization of a mixture of copolymerizable materials consisting of (1) a polymerizable esterification product of ingredients comprising a polyhydric alcohol, a monohydric alcohol and an alpha unsaturated alpha beta polycarboxylic acid, and (2) a monoallyl ester of a non-vinylic mono-esterifiable acid, said monoallyl ester constituting from 10 to 40 per cent by weight of the mixed components of (1) and (2).

13. A resinous composition obtained by polymerization of a mixture of copolymerizable materials consisting of (1) a polymerizable esterification product of ingredients comprising a polyhydric alcohol, an alpha unsaturated alpha beta polycarboxylic acid and a polycarboxylic acid selected from the class consisting of saturated aliphatic polycarboxylic acids and aromatic polycarboxylic acids, and (2) a monoallyl ester of a non-vinylic mono-esterifiable acid, said monoallyl ester constituting from 10 to 40 per cent by weight of the mixed components of (1) and (2).

14. A resinous composition obtained by polymerization of a mixture of copolymerizable materials consisting of (1) a polymerizable esterification product of ingredients comprising a polyhydric alcohol, an alpha unsaturated alpha beta polycarboxylic acid and a monocarboxylic acid, and (2) a monoallyl ester of a non-vinylic mono-esterifiable acid, said monoallyl ester constituting from 10 to 40 per cent by weight of the mixed components of (1) and (2).

15. As a new product, a synthetic resin consisting of the product of polymerization of a mixture consisting of (1) diethylene glycol maleate and (2) allyl acetate in an amount corresponding to from 3 to 50 per cent by weight of the mixed components of (1) and (2).

16. The method of producing new synthetic compositions which comprises (1) forming a polymerizable composition consisting of (a) an unsaturated alkyd resin, (b) a monoallyl ester of a non-vinylic mono-esterifiable acid in an amount corresponding to from 3 to 50 per cent by weight of the mixture of the said resin and ester, and (c) a catalyst for accelerating the copolymerization of the copolymerizable materials of (a) and (b), and (2) polymerizing the said polymerizable composition to form an interpolymer of the said unsaturated alkyd resin and monoallyl ester.

GAETANO F. D'ALELIO.

CERTIFICATE OF CORRECTION.

Patent No. 2,308,495.   January 19, 1943.

GAETANO F. D'ALELIO.

It is hereby certified that error appears in the printed specification of the above numbered patent requiring correction as follows: Page 1, first column, line 54, for "phenol" read --phenolic--; and second column, line 6, for "at" read --as--; line 9, after "naphthyl" strike out the hyphen and insert instead a comma; line 38, after "monobutyl" strike out the comma and insert the same after "adipate", same line; line 40, for "monobtuyl" read --monobutyl--; page 2, first column, line 18, after "dimethyl" strike out the comma; and second column, line 52, for "acids." read --acids,--; page 5, first column, line 26, in the formula, for "CH$_2$OCOCtH$_{13}$" read --CH$_2$OCOC$_6$H$_{13}$--; and second column, line 23, for "CHC$_2$OCOC$_2$H$_5$" read --CHCH$_2$OCOC$_2$H$_5$--; page 6, first column, line 20, for "alkyl" read --alkyd--; and that the said Letters Patent should be read with this correction therein that the same may conform to the record of the case in the Patent Office.

Signed and sealed this 2nd day of March, A. D. 1943.

Henry Van Arsdale,
Acting Commissioner of Patents.

(Seal)